(12) United States Patent
Bohn et al.

(10) Patent No.: US 6,207,945 B1
(45) Date of Patent: Mar. 27, 2001

(54) INTEGRAL POSITIONING AND IMAGING DEVICE

(75) Inventors: David D. Bohn; Michael J. Steinle, both of Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/343,880

(22) Filed: Jun. 30, 1999

(51) Int. Cl.[7] .......................... H04N 1/047; G06K 7/015
(52) U.S. Cl. .................... 250/208.1; 250/234; 358/473
(58) Field of Search .................. 250/208.1, 208.2, 250/208.3, 208.6, 559.44, 559.48, 234, 235, 556, 557, 221, 222.1; 358/473, 488

(56) References Cited

U.S. PATENT DOCUMENTS

| | | | |
|---|---|---|---|
| 5,144,132 | * 9/1992 | Kitakado | 250/208.1 |
| 5,252,818 | * 10/1993 | Gerlach et al. | 250/208.1 |
| 5,578,813 | 11/1996 | Allen et al. | 250/208.1 |
| 5,644,139 | 7/1997 | Allen et al. | 250/557 |
| 5,729,008 | * 3/1998 | Blalock et al. | 250/208.1 |

\* cited by examiner

Primary Examiner—John R. Lee (57) ABSTRACT

An imaging device is disclosed wherein the imaging portion of the imaging device is integrated into an optical positioning system. The imaging device has a linear array of photodetector elements that are used to generate machine-readable image data representing an object being imaged. At least one two-dimensional photodetector segment comprising a two-dimensional array of photodetector elements is integrated into the linear array of photodetector elements. The two-dimensional photodetector segments serve the dual function of providing image data and positioning data.

19 Claims, 6 Drawing Sheets

INTEGRAL POSITIONING AND IMAGING DEVICE

FIELD OF THE INVENTION

The present invention relates to position sensing devices and, more particularly, to a hand-held scanner having a position sensing device integrated into the imaging portion of the hand-held scanner.

BACKGROUND OF THE INVENTION

Hand-held scanning devices are portable imaging devices that generate machine-readable image data (sometimes referred to herein simply as image data) representing an image of an object. Generating image data representative of an object is sometimes referred to as "imaging" or "scanning" the object. Some scanning devices generate image data representing a narrow "scan line" portion of the object being imaged. During the imaging process, the scanning device is moved relative to the object being imaged. As the scanning device is moved relative to the object, it generates image data representing a plurality of sequential scan line portions of the image of the object. The image of the object is, accordingly, represented by the image data of the cumulation of sequential scan lines similar to the image of the object represented by a video display.

The image of the scan line portion of the object is focused onto a linear array of photodetector elements (sometimes referred to herein simply as photodetectors). The photodetectors may, as an example, be mounted to a plurality of electronic segments such as contact image sensors as are known in the art. The photodetectors may also be etched into a single semiconductor as is common in a charge-coupled device. The individual photodetectors generate image data representing discrete portions of the image of the scan line portion of the object. The image data may, as an example, be voltage values that correspond to the intensity of light received by the photodetectors. For example, photodetectors that receive relatively high intensities of light may output relatively high voltages and photodetectors that receive relatively low intensities of light may output relatively low voltages.

The image data is output from the photodetectors to a processor. One of the functions of the processor is to create a data base that indicates the position on the image of the object from where each scan line was generated. The data stored in the data base and the image data are used by the processor to replicate the image of the object. As an example, in the situation where the scanning device is generating image data representing a two-dimensional object, such as text located on a piece of paper, the hand-held scanning device may be moved in any direction on the paper. Accordingly, the scan line portions may be generated from virtually any location on the paper, which leads to the image data representing the image of the object consisting of a plurality of scan line portions that may be skewed over the surface of the object. In order to replicate the image of the object, the hand held scanning device uses the data stored in the object to determine the proper placement of the scan line portions of the image of the object when the image is replicated. The processor may then create an electronic image of the object by known processing techniques, e.g., stitching software.

A problem replicating the image of the object may be encountered if the velocity of the scanning device relative to the object becomes unknown during the scanning process. For example, if the scanning device is imaging one thousand scan line portions of the image of the object per second and the scanning device is moving along a single axis at a constant rate of one inch per second relative to the object, each scan line represents one one-thousandth of an inch of the image of the object. If the correct velocity of the scanning device relative to the object has been conveyed to the processor, the processor will create a data base indicating that each scan line represents one one-thousandth of and inch of the image of the object. Based on the image data and the data stored in the data base, the processor may accurately replicate the image of the object. If, however, the velocity of the scanning device relative to the object is decreased and the decreased velocity is not conveyed to the processor, the processor will continue to process the image data as though each scan line represents one one-thousandth of an inch of the object. Each scan line, however, will represent less than one one-thousandth of an inch of the object. Accordingly, the image of the object will be distorted. If, on the other hand, the velocity of the scanning device relative to the object is increased and the increased velocity is not conveyed to the processor, the image of the object will be stretched.

It is extremely difficult, if not impossible, to accurately replicate an image of an object when either the velocity or position of the scanning device relative to the object becomes unknown. If either the position or velocity is not known, the processor will not know where the scanning device is located relative to the object as the scan lines are being generated. Accordingly, the processor will not be able to properly place the scan line portions relative to each other so as to accurately replicate the image of the object. This problem is exacerbated in hand-held scanning devices where the scan lines may be generated from anywhere on the object and are often skewed.

In order to overcome this positioning problem, some scanning devices use position sensors to detect the location of the scanning device relative to the object as the scan lines are being generated. The position sensors output position information pertaining to the position of the scanning device relative to the object as scan line portions are being generated. This position information is conveyed to the processor where it is incorporated into the above-described data base.

One example of a position sensor is an optical sensor affixed to the scanning device that periodically generates image data from a small two-dimensional area of the object being scanned. A processor receives this image data and identifies distinct features on the object. In the example where the object is text printed on a sheet of paper, the distinct features may be inherent irregularities in the surface of the paper. The positions of these distinct features relative to the optical sensor are stored in a memory device. As the scanning device is moved relative to the object, the positions of these distinct features move relative to the optical sensor. The processor compares the new positions of these distinct features to the positions stored in the memory device. Based on these comparisons, the processor is able to determine the position, direction of movement, and velocity of the scanning device to which the optical sensor is affixed relative to the object. Accordingly, the processor is able to create the above-described data base because the locations of the scan line portions of the image of the object relative to each other may be readily determined.

Some scanning devices may have several of these two-dimensional optical sensors located at fixed locations relative to the linear array of photodetectors. In some scanning devices, an optical sensor is spaced a distance from each end of the linear array of photodetectors and are, thus, located outside of the linear array of photodetectors. These locations of the optical sensors present problems when a user operates the scanning device in the vicinity of the edge of the object, i.e., text near the edge of a sheet of paper. As the linear array of photodetectors images the edge of the paper, the optical sensor nearest the edge of the paper may inadvertently be moved off the paper and onto another surface that supports the paper, e.g., a desk top. If the optical sensor is unable to detect distinct features on the other surface or if the paper moves relative to the other surface, the processor will not know the position of the scanning device relative to the paper. Accordingly, the text on the paper will not be able to be replicated by the processor. This placement of the optical sensors has another disadvantage in that it increases the length of the scanning device by the distance the optical sensors are spaced from each end of the linear array of photodetectors. This increased length of the scanning device is inherently detrimental to a hand-held scanning device.

Some other scanning devices space the optical sensors a distance above or below the linear array of photodetectors. This location of the optical sensors causes the width of the hand-held scanning device to be increased, which, as with the increased length of a hand-held scanning device, is inherently detrimental. The wider hand-held scanning device also presents a problem because a user may not know from where on the object the scan line portions are being generated. As an example, a user scanning a page of text may not properly position the scanning device relative to the text and may inadvertently not image a portion of the text. An additional problem, as described above, may be encountered if the optical sensors are moved off the page and onto another surface. As with the above-described scanning device, the optical sensors may not be able to detect distinct features on this surface, which will cause errors when the image data is processed. Specifically, the positions of the scan lines will not be accurately determined, which will cause errors when the processor attempts to replicate the image of the page.

Therefore, a need exists for a hand-held scanning device that is able to determine its position relative to an object being imaged wherein the length and width of the scanning device are minimized.

SUMMARY OF THE INVENTION

An imaging device having an imaging portion integrated into a positioning portion is disclosed herein. The imaging device may comprise a linear array of photodetector elements having a first end and a second end, wherein the linear array may be aligned along a first axis. At least one two-dimensional photodetector segment may be integrated into the linear array of photodetector elements between the first end and the second end.

A method of imaging an object is also disclosed herein. The method may comprise: providing a linear array of photodetector elements aligned along a first axis, the array having a first end and a second end; providing at least one two-dimensional photodetector segment integrated into the linear array of photodetector elements, the two-dimensional photodetector segment having a plurality of rows of photodetector elements wherein one of the plurality of rows is a scan row; causing relative movement between the linear array of photodetector elements and the object; focusing an image of the object onto the linear array of photodetector elements and the two-dimensional photodetector segment; generating first image data representative of the object with the linear array of photodetector elements and the scan row; generating second image data representative of the object with the two-dimensional photodetector segment; and performing a first analysis on the second image data to determine the position of the two-dimensional photodetector segment relative to the object.

Another embodiment of the imaging device is also disclosed herein. The imaging device may comprise a first imaging means for converting a linear portion of an image of an object to machine-readable data. A second imaging means for converting a two-dimensional portion of an image of the object to machine-readable data may be integrated into the first imaging means. A first processing means may be operatively associated with the second imaging means and may serve to determine the location of the second imaging means relative to the object.

DETAILED DESCRIPTION OF THE INVENTION

Figure 1:
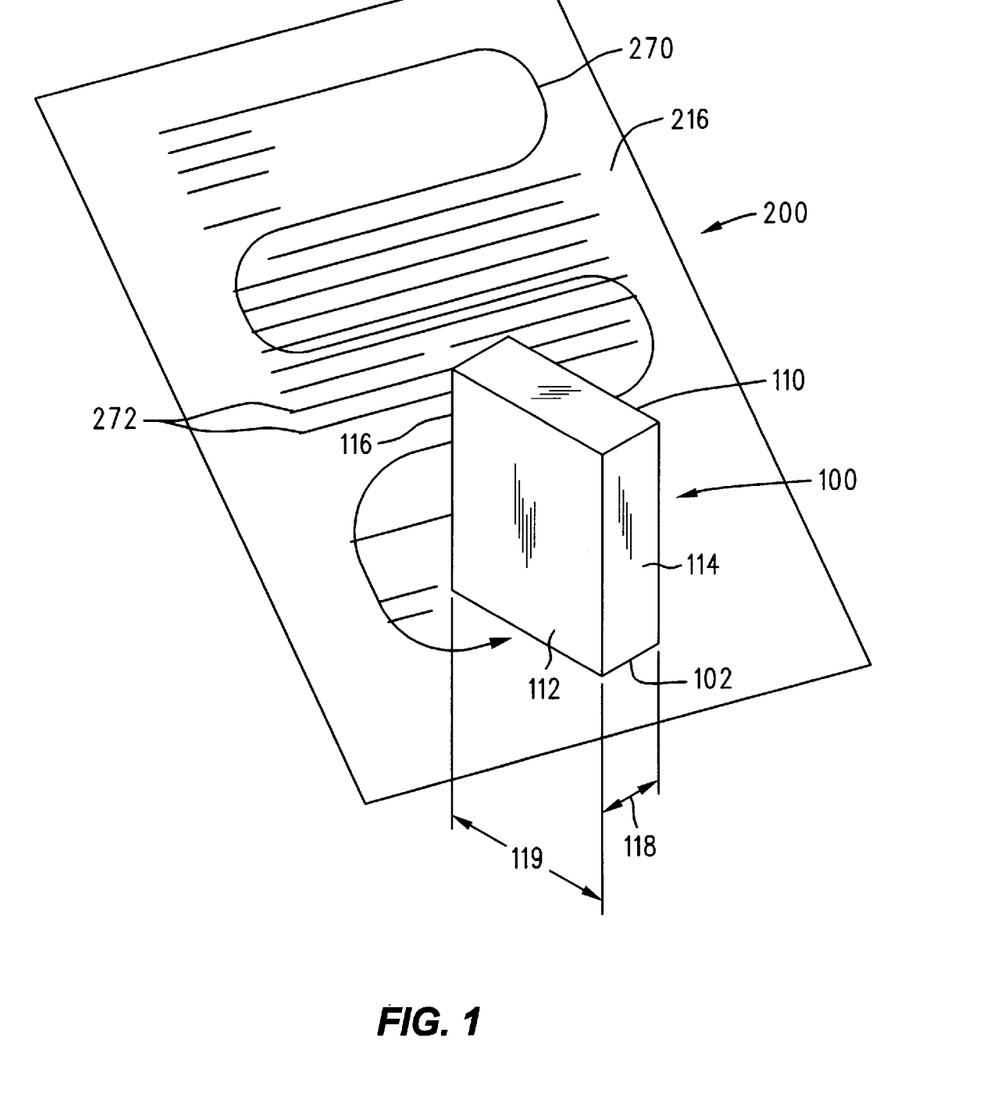
FIG. 1 is an illustration of a hand-held scanner following a meandering path on the surface of a sheet of paper.
Figure 2:
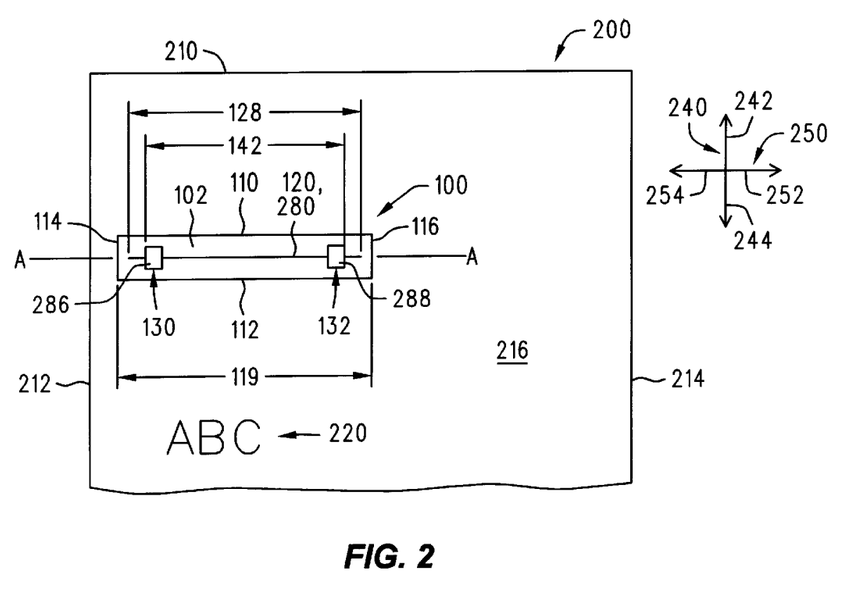
FIG. 2 is a top cut away view of the hand-held scanner of FIG. 1.
Figure 3:
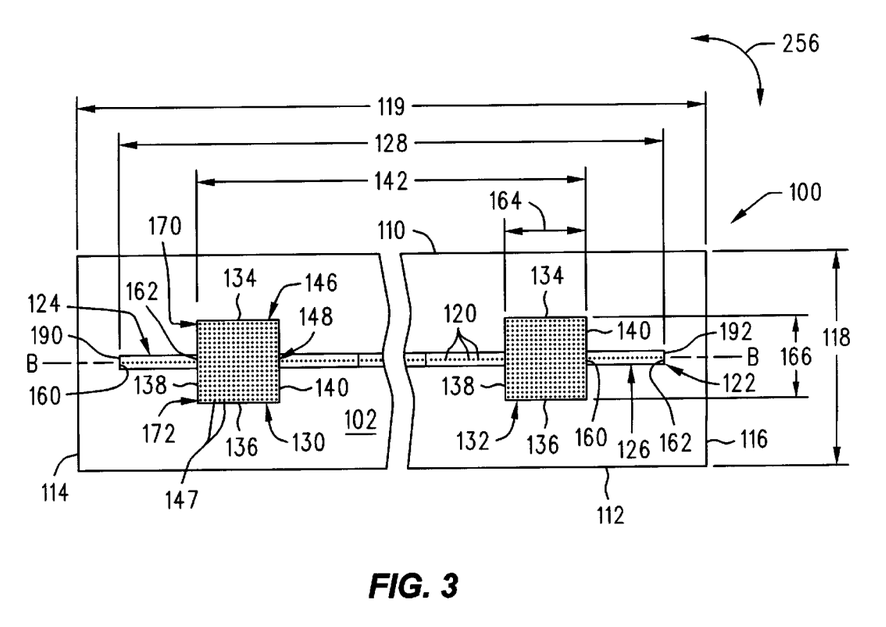
FIG. 3 is a bottom view of the hand-held scanning device of FIG. 1.

FIGS. 1 through 7, in general, illustrate an imaging device 100 comprising: a linear array of photodetector elements 120, the linear array having a first end 190 and a second end 192, wherein the linear array is aligned along a first axis BB in FIG. 3; at least one two-dimensional photodetector segment 130 comprising a two-dimensional array of photodetector elements 147, wherein the at least one two-dimensional photodetector segment 130 is integrated into the linear array of photodetector elements 120 between the first end 190 and the second end 192.

FIGS. 1 through 7 also, in general, illustrate an imaging device 100 comprising: a linear array of photodetector elements 120, the linear array having a first end 190 and a second end 192; at least one two-dimensional photodetector segment 130 comprising a two-dimensional array of photodetector elements 147; wherein the two-dimensional photodetector segment 130 is located between the first end 190 and the second end 192; and wherein the two-dimensional photodetector segment 130 is spaced from both the first end 190 and the second end 192.

FIGS. 1 through 7 also, in general, illustrate a method of imaging an object 200 comprising: providing a linear array of photodetector elements 120 aligned along a first axis BB in FIG. 3, the array having a first end 190 and a second end 192; providing at least one two-dimensional photodetector segment 130 integrated into the linear array of photodetector elements 120, the at least one two-dimensional photodetector segment 130 having a plurality of rows 146 of photodetector elements 147 wherein one of the plurality of rows 146 is a scan row 148; causing relative movement between the linear array of photodetector elements 120 and the object 200; focusing an image of the object 200 onto the linear array of photodetector elements 120 and the at least one two-dimensional photodetector segment 130; generating first image data representative of the object 200 with the linear array of photodetector elements 120 and the scan row 148; generating second image data representative of the object 200 with the at least one two-dimensional photodetector segment 130; and performing a first analysis on the second image data to determine the position of the at least one two-dimensional photodetector segment 130 relative to the object 200.

FIGS. 1 through 7 also, in general, illustrate an imaging device 100 comprising: a first imaging means 120 for converting a linear portion 280 of an image of an object 200 to machine-readable data; a second imaging means 130 for converting a two-dimensional portion of an image of the object 200 to machine-readable data, the second imaging means 130 being integrated into the first imaging means 120; a first processing means 150 operatively associated with the second imaging means 130 for determining the location of the second imaging means 130 relative to the object 200.

Having described the imaging device 100 in general, it will now be described in greater detail. The imaging device 100 is summarized below with a more detailed description of the imaging device 100 following the summary. The imaging device 100 is a device that converts an image of an object to machine-readable image data, sometimes referred to herein simply as image data. The imaging device 100 is sometimes referred to as a scanner. The process of generating image data representing the image of an object is sometimes referred to as scanning or imaging the object. It is to be understood, however, that the imaging device used in a scanner is for illustration purposes only and that the imaging device may be used in other applications.

FIG. 1 illustrates the imaging device 100 scanning a page 200 of text 272. The imaging device 100 is depicted as being a hand-held type of scanner wherein a user may move the imaging device 100 relative to the page 200. FIG. 1 illustrates the imaging device 100 following a meandering path 270 on a surface 215 of the page 200 wherein the path 270 illustrates the relative movement between the imaging device 100 and the page 200. As will be described in detail below, the imaging device 100 generates image data representative of scan line portions of the page 200 as the imaging device 100 is moved relative to the page 200. The image data, thus, represents a plurality of scan line portions of the page 200 that may be skewed over the page 200. In order to properly replicate the image of the page 200, it is critical that the imaging device 100 know its position relative to the page 200 as the scan lines are being generated. The image data may be electronically tagged with the position information so that the image of the page 200 may be accurately replicated. If the position information is not available or is inaccurate, the imaging device 100 will not know where to place the replicated scan line portions of the image of the page 200 when it replicates the image of the page 200. The replication of the page 200 will, thus, be inaccurate.

FIG. 2 illustrates the footprint of the imaging device 100 located on a surface 216 of the page 200 of text, wherein the text 220 is an example of the text 272 illustrated in FIG. 1. Specifically, FIG. 2 illustrates a top cut away view of the imaging device 100 set on the page 200. The imaging device 100 may have a linear array of photodetectors 120 that generate the image data representative of a narrow scan line portion 280 of the surface 216. The photodetectors 120 are illustrated in FIG. 2 as being a line. It is to be understood, however, that the photodetectors 120 are discrete elements. In the top view of FIG. 2, the scan line portion 280 of the surface 216 is the same size as the linear array of photodetectors 120.

During the scanning process, a user manually moves the imaging device 100 relative to the surface 216 of the page 200. An example of this movement is illustrated by the meandering path 270 of FIG. 1. Referring again to FIG. 2, as the imaging device 100 is moved relative to the surface 216, the photodetectors 120 periodically generate image data representing scan line portions 280 of the surface 216. A processor, not shown in FIG. 2, receives the image data and processes the image data to create an electronic image of the surface 216. It is critical that the positions of the photodetectors 120 relative to the surface 216 be known as the image data is being generated in order to properly create the electronic image of the surface 216. This position information is required in order for the processor to know the locations on the object from where the image data was generated. If the position data is not accurate, the processor will not be able to properly position the scan lines 280 relative to each other during processing which will cause the image of the object to be improperly replicated.

The problem of determining the position of the scan lines 280 relative to the surface 216 is exacerbated because the imaging device 100 is a hand-held type of scanner. A user manually moves the hand-held imaging device 100 relative to the surface 216, accordingly, the user may move the imaging device 100 in any random direction relative to the surface 216 as illustrated by the path 270, FIG. 1. This random movement causes the imaging device 100 to generate image data representing scan lines 280 that are typically skewed relative to each other. Accordingly, the imaging device 100 is required to accurately determine the positions of these skewed scan lines so that the processor may accurately replicate the image of the surface 216.

In order to determine the positions of the scan lines relative to the object, some imaging devices use position sensors that determine the location of the imaging device relative to the object being scanned as image data is being generated. One type of position sensor is an optical sensor that generates image data of a two-dimensional portion of the surface of the object. A processor analyzes the image data to identify the positions of distinct features located on the surface of the object relative to the optical sensor. As the imaging device is moved relative to the object, the positions of these distinct features relative to the optical sensor move accordingly. The processor measures these position changes to determine the displacement and direction of movement of the imaging device relative to the surface of the object. The processor may also differentiate the displacement to determine the velocity of the scanner relative to the surface of the object. Examples of position sensors that image two-dimensional areas of an object are disclosed in the following U.S. patents: U.S. Pat. No. 5,644,139 of Allen et al. for NAVIGATION TECHNIQUE FOR DETECTING MOVEMENT OF NAVIGATION SENSORS RELATIVE TO AN OBJECT; and U.S. Pat. No. 5,578,813 of Allen et al. for FREEHAND IMAGE SCANNING DEVICE WHICH COMPENSATES FOR NON-LINEAR MOVEMENT, which are both hereby incorporated by reference for all that is disclosed therein.

These scanners that use position sensors typically have the position sensors spaced a distance from the photodetectors because they serve separate functions. The position sensors are two-dimensional arrays that image distinct features of the surface of the object. These distinct features are typically very fine, such as pulp material used in the manufacture of paper. The position sensors, thus, need to be able to generate two-dimensional image data of very fine surface features. The linear array of photodetectors, on the other hand, images a one-dimensional axis on the surface of the object to generate image data of typically less fine features, e.g., text on a piece of paper. Thus, the position sensors typically have a higher concentration of photodetectors than the one-dimensional linear array of photodetectors. The concentration of photodetectors is sometimes referred to as the pitch. The position sensors may, as an example have approximately 600 photodetectors per inch and the linear array of photodetectors may have approximately 300 photodetectors per inch. It is to be understood, however, that the required concentration of photodetectors depends on the specific application of the scanning device. It is also to be understood that the position sensors and the two-dimensional array of photodetectors may have the same concentration of photodetectors.

Some scanning devices space the position sensors a distance from the ends of the linear array of photodetectors. Other scanning devices space the position sensors above or below the linear array of photodetectors. These locations of the position sensors relative to the linear array of photodetectors present three primary problems when they are used in hand-held type scanners. The first problem is that the foot print of the scanner is required to be larger than just the area occupied by the linear array of photodetectors because it has to include the area occupied by the linear array of photodetectors in addition to the area occupied by the position sensors. Any unnecessary increase in the footprint of a hand-held type of scanner is generally detrimental because it tends makes the hand-held scanner cumbersome to use. This, in turn, tends to makes the scanner less portable.

The second problem caused by these locations of the position sensors is that the position sensors and the linear array of photodetectors must generate image data from different portions of the same object. Thus, both the position sensors and the linear array of photodetectors must be kept in a position that allows all of them to generate image data from different portions of the same object during the scanning operation. The position sensors may be rendered inoperative if they are inadvertently moved off of the surface of the object during the scanning operation. For example, referring to FIG. 2, if the user is using a conventional scanner on the surface 216 of the page 200, he or she may want to scan text that is located near an edge 210, 212, 214 of the page 200. If the linear array of photodetectors is moved too close to an edge 210, 212, 214, a position sensor may move off the surface 216. If, for example, the page 200 is in a book, the position sensor may be suspended in air and unable to image any surface. Accordingly, position data will not be generated and an image of the object represented by the image data will not be able to be processed or replicated. If, on the other hand, the page 300 is located on a surface which provides features that are distinct enough for the position sensors to operate, position data may be generated and the image data may be properly processed. If, however, the page 200 is moved relative to the surface on which the sensor is located, the position data will be corrupted. An image of the surface 216 represented by the image data will also be corrupted.

The third problem with locating the position sensors separate from the linear array of photodetectors is that the linear array of photodetectors and each position sensor require separate optical components. For example, if the scanner has one linear array of photodetectors and two position sensors, the scanner requires one lens associated with the linear array of photodetectors and one lens associated with each position sensor. The use of these optical components increases the cost of the scanner due to the expense of the optical components and the manufacturing time required to properly align the optical components within the scanner.

Referring to FIG. 2, the imaging device 100 disclosed herein overcomes the above-described problems by having a left sensor 130 and a right sensor 132 integrated into the linear array of photodetectors 120. The sensors 130, 132 generate image data representing two-dimensional areas of the surface 216. A processor, not shown in FIG. 2, receives the image data and detects distinct features of the surface 216. These distinct features may be due, in part, to slight variations in the surface 216 caused by the pulp material used to make the page 200. As the imaging device 100 moves relative to the surface 216, the images of these distinct features move relative to the sensors 130, 132. The processor measures the relative movement of the images and, based on this movement, calculates the position of the imaging device 100 relative to the surface 216. Based on this relative movement, the processor may also calculate the velocity and direction of movement of the imaging device 100 relative to the surface 216. The sensors 130, 132 may, for example, be of the type disclosed in the following U.S. patents: U.S. Pat. No. 5,644,139 of Allen et al. and U.S. Pat. No. 5,578,813 of Allen et al., both of which have been previously referenced.

FIG. 3 illustrates a bottom view of the imaging device 100 illustrated in FIGS. 1 and 2 and is included to better illustrate the photodetectors 120 and sensors 130, 132. The size of the photodetectors 120 and sensors 130, 132 have been greatly enlarged in FIG. 3 for illustration purposes. The linear array of photodetectors 120 may be mounted to a plurality of individual segments 122. The segments 122 may be arranged to form a linear array, thus, the photodetectors 120 form a linear array. The position sensors 130, 132 may also be segments located within the linear array of segments 122. The position sensors 130, 132 may have two-dimensional arrays of photodetectors 147 consisting of a plurality of rows 146 of photodetectors 147. One row 148 of photodetectors 147, sometimes referred to herein as the scan row 148, may be aligned with the linear array of photodetectors 120. The scan row 148 serves the dual function of providing image data and position data to processors, not shown in FIG. 3. This dual function allows the position sensors 130, 132 to be integrated into the array of photodetectors 120 as illustrated in FIG. 3. The imaging device 100 disclosed herein, thus, has a smaller footprint than conventional scanners and the aforementioned problems associated with locating the position sensors a distance from the linear array of photodetectors are alleviated.

Having summarized the imaging device 100, it will now be described in greater detail. Referring to FIG.1, the imaging device 100 with the position sensors integrated into the linear array of photodetectors is described herein as being used in a hand-held type of scanner. It is to be understood, however, that position sensors integrated into a linear array of photodetectors may be applicable to other types of scanners and optical devices. The imaging device 100 may have a front portion 110, a rear portion 112, a left portion 114, and a right portion 116 as viewed from the front portion 110. The front portion 110, rear portion 112, left portion 114, and right portion 116 may define the dimensions of a bottom portion 102, which is illustrated in greater detail in FIG. 3. The imaging device 100 may have a length 119 extending between the left portion 114 and the right portion 116. The scanner may also have a width 118 extending between the front portion 110 and the rear portion 112. One of the criteria in the design of the hand-held imaging device 100 is to reduce the length 119 and the width 118, thus, making the imaging device 100 less cumbersome to operate and more portable.

FIG. 3 illustrates a view of the bottom portion 102 of the imaging device 100. A plurality of photodetector segments 122 (sometimes referred to herein simply as segments 122) may be mounted within the imaging device 100 and in the proximity of the bottom portion 102. The segments 122 may, as an example, be contact image sensors as are known in the art. The plurality of segments 122 may have a first segment 124 and a last segment 126. The segments 122 may each have a first end 160 and a second end 162 as illustrated on the segments 124 and 126. The segments 122 may be arranged end to end to from a linear array of segments 122. The array may have a first end 190 and a second end 192. An array length 128 may extend between the first end 190 and the second end 192. An example of a commercially available segment is known as the Linear Optical Array, Model Number TSL2301, manufactured by Texas Instruments, Inc. of Austin, Tex.

A linear array of photodetectors 120 may extend between the first end 160 and the second end 162 of each segment 122. The linear array of photodetectors 120 may be arranged on the segments 122 so that there are approximately 600 photodetectors 120 per inch. The linear array of segments 122 may be mounted within the imaging device 100 so that the linear array of photodetectors 120 mounted to each segment 122 forms a linear array of photodetectors 120 extending the length 128 of the linear array of segments 122. Accordingly, the linear array of photodetectors 120 may extend between the first end 190 and the second end 192 of the array of segments 122. Furthermore, the linear array of photodetectors 120 may extend along a reference line BB in FIG. 3.

The photodetectors 120 serve to convert light to image data in a conventional manner. The photodetectors 120 may, as an example, output voltages that are proportional to the intensity of light they receive. For example, photodetectors 120 that receive a relatively high intensity of light may output relatively high voltages and photodetectors 120 that receive a relatively low intensity of light may output relatively low voltages.

A left position sensor 130 and a right position sensor 132 may be integrated within the linear array of photodetectors 120. The position sensors 130, 132 are sometimes referred to herein simply as sensors. The sensors 130, 132 may have a top side 134, a bottom side 136, a left side 138, and a right side 140. The sensors 130, 132 may have a length 164, e.g., approximately 3.0 millimeters, extending between the left side 138 and the right side 140. The sensors 130, 132 may also have a height 166, e.g., approximately 3.0 millimeters, extending between the top side 134 and the bottom side 136.

The left side 138 of the left sensor 130 may be separated from the right side 140 of the right sensor 132 by a sensor distance 142. The distance 142 may, as an example, be approximately 79 millimeters, which yields a distance between the centers of the sensors 130, 132 of approximately 76 millimeters. It has been found that as the distance 142 is increased, the imaging device 100 is able to more accurately determine its rotational position relative to a surface. This is the result of the sensors 130, 132 being better able to detect the movement of distinct features on the surface of an object as the imaging device 100 is rotated in a direction 256.

The sensors 130, 132 may comprise a plurality of rows 146 of photodetectors 147, wherein each row 146 is substantially similar to the linear array of photodetectors 120 extending between the first end 160 and the second end 162 on the segments 122. The sensors 130, 132 may, as an example, have approximately 48 rows 146 wherein each row 146 is comprised of approximately 48 photodetectors 147 having a pitch of approximately 0.06 millimeters. A smaller pitch, however, will yield a higher concentration of photodetectors 147, which in turn, will yield higher precision in determining the position of the imaging device 100.

The photodetectors 147 may substantially occupy the surfaces of the sensors 130, 132 illustrated by the view of FIG. 3. A scan row 148 may be a row 146 of photodetectors 147 that is aligned along the reference line BB. The scan row 146 is, thus, aligned along the same axis as the linear array of photodetectors 120. The sensors 130, 132 and the photodetectors 120, 147 illustrated in FIG. 3 have been greatly enlarged for illustration purposes.

The sensors 130, 132 may each have a first row 170 and a last row 172 that will be used as references later in this description. The first row 170 and the last row 172 may be separated by a distance that is substantially equal to the height 166. As with the photodetectors 120 in the linear array, the photodetectors 147 may output voltages that are proportional to the intensity of light they receive. The sensors 130, 132 and specifically the scan rows 148 may, as will be described in detail below, serve the dual function of generating image data and positioning data.

FIG. 2 illustrates a cut away top view of the imaging device 100 set on the surface 216 of the page 200. The linear array of photodetectors 120 may serve to image a narrow scan line portion 280 of the surface 216 located beneath the photodetectors 120. The scan line portion 280 may be substantially the same size as the linear array of photodetectors 120. The area of the surface 216 located beneath the left sensor 130 is referred to herein as the left position portion 286 and the area of the surface located beneath the right position sensor 132 is referred to herein as the right position portion 288. As will be described below, the left sensor 130 images the left position portion 286 and the right sensor 132 images the right position portion 288. The left position portion 286 and the right position portion 288 may be approximately the same size as the position sensors 130, 132, FIG. 3.

Figure 4:
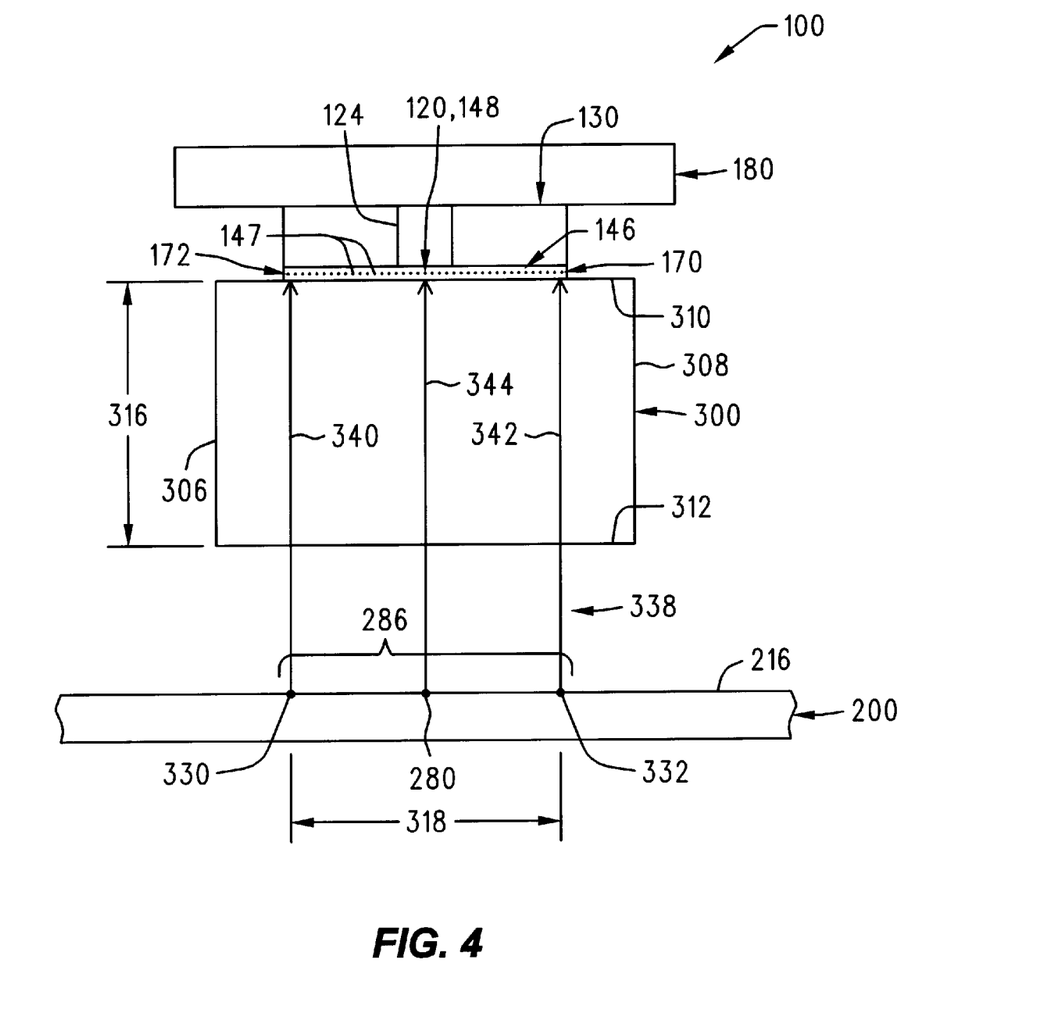
FIG. 4 is side cut away view of the hand held scanning device of FIG. 1.

FIG. 4 illustrates a side cut away view of the left portion of the imaging device 100. The side view illustrates the left segment 124 and the left sensor 130. The other segments and the right sensor are not illustrated in FIG. 4. The sensors and segments may be operationally associated with a substrate 180, i.e., they may be electrically and mechanically connected to the substrate 180. For illustration purposes, only the left segment 124 and the left sensor 130 are illustrated in FIG. 4 as being connected to the substrate 180. The substrate 180 may, as an example, be a printed circuit board that transmits data to and from the segments and sensors.

The imaging device 100 may further include a lens 300 positioned between the photodetectors 120, 147 and the surface 216 of the page 200. The lens 300 may serve to focus an image originating on the surface 216 onto the photodetectors 120, 147 in a conventional manner. The lens 300 may have a left portion 306, a right portion 308, an upper portion 310, and a lower portion 312. The lens 300 may have a height 316 extending between the upper portion 310 and the lower portion 312. The lens 300 may also have a width 318 extending between the left portion 306 and the right portion 308. The height 316 may, as an example, be approximately 8.43 millimeters and the width 318 may, as an example, be approximately 3.0 millimeters. The lens 300 may have a positive magnification of one. The lens 300 may, as an example, be a gradient index lens array commercially available from NSG America, Inc. and sold under the trademark SELFOC.

A light path 338 may extend between the surface 216, through the lens 300 and to the photodetectors 120, 147. The light path 338 will be described herein as being bound by a left portion 340 and a right portion 342. The left portion 340 may extend between a left point 330 on the surface 216 of the page 200, through the lens 300, and to the last row 172 of photodetectors 147 on the left sensor 130. The right portion 342 may extend between a right point 332 on the surface 216, through the lens 300, and to the first row 170 of photodetectors 147. The left portion 340 may be substantially parallel to the right portion 342. The left point 330 and the right point 332 may be separated by a distance 318, which may be substantially similar to the height 166, FIG. 3, of the sensors 130, 132. As will be described in detail below, the left positioning portion 286 of the surface 216 may be imaged by the photodetectors 147 on the left sensor 130. A similar light path, not illustrated, may be associated with the right sensor 132.

The portion of the surface 216 between the left point 330 and the right point 332 is a one-dimensional side view of the left positioning portion 286 illustrated in FIG. 2. Another light path 344 may extend between the scan line portion 280 of the surface 216, through the lens 300 and to the scan row 148 of photodetectors 147 and the linear array of photodetectors 120. The light path 344 may be a constituent of the light path 338. As will be described in greater detail below, the scan line portion 280 of the surface 216 may be imaged by the scan row 148 of photodetectors 147 and the linear array of photodetectors 120.

Figure 5:
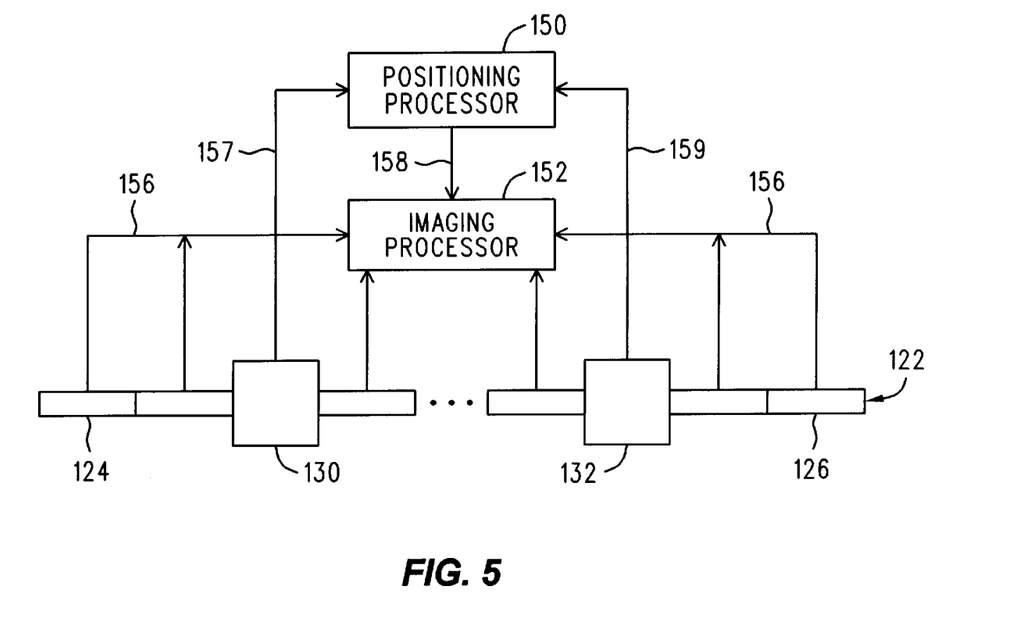
FIG. 5 is a flow diagram illustrating the operation of the hand-held scanning device of FIG. 1.
Figure 6A:
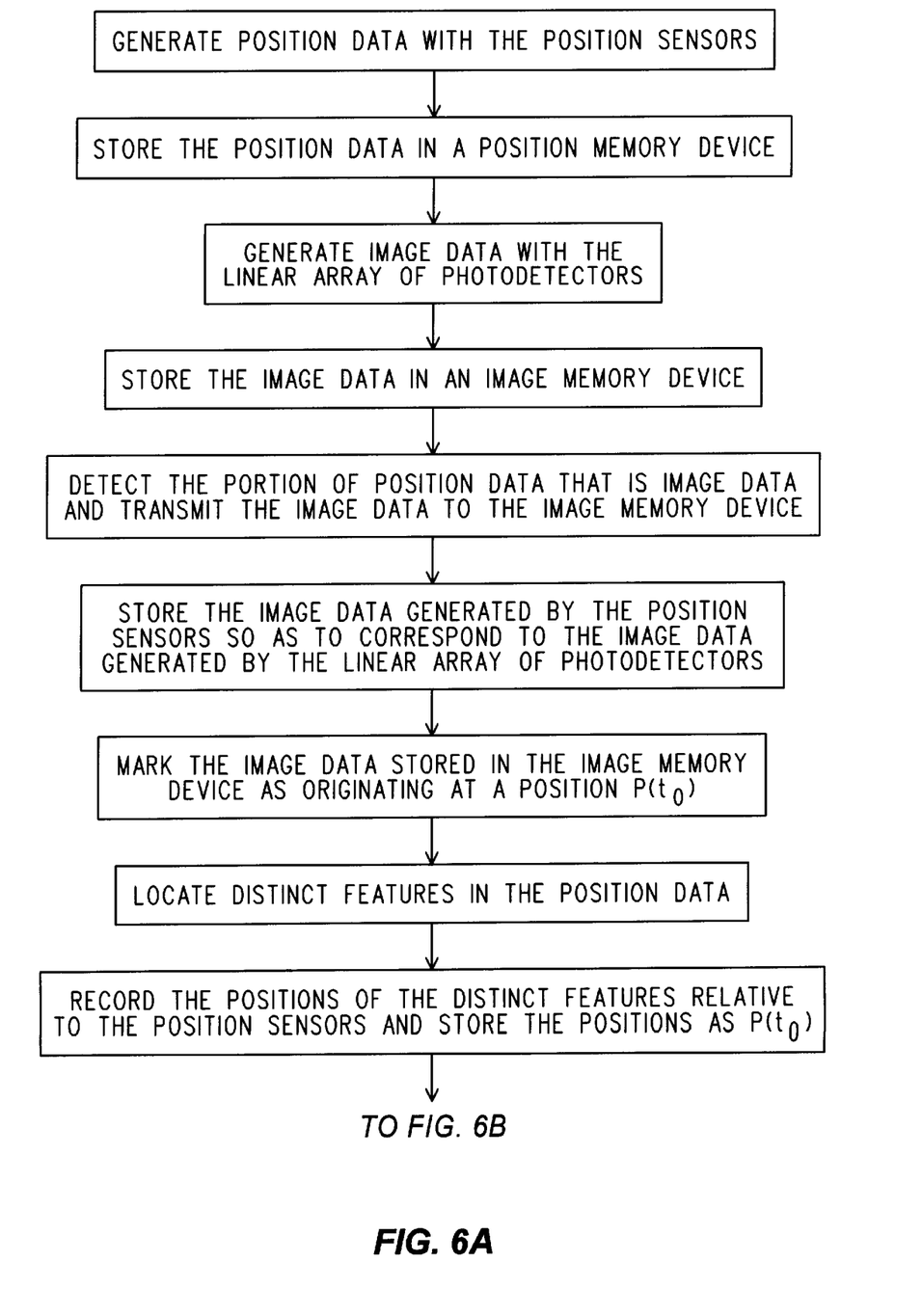
FIG. 6A and FIG. 6B are a flow chart describing the operation of the scanning device of FIG. 1.
Figure 6B:
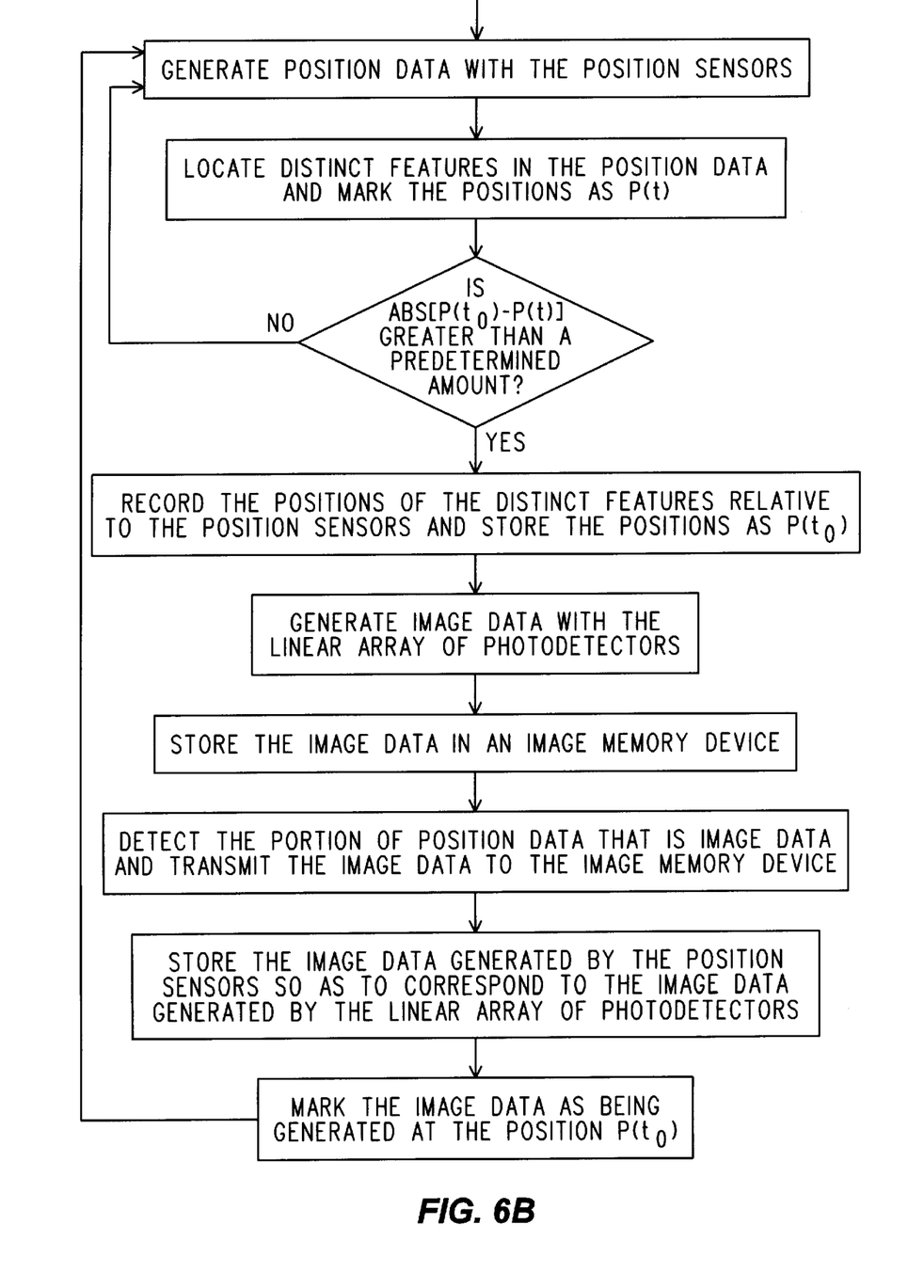

FIG. 5 illustrates the electrical connections between the segments 122, the sensors 130, 132 and a positioning processor 150 and an imaging processor 152. The segments 122 may be electrically connected to the imaging processor 152 via a data bus 156. The data bus 156 may serve to transmit image data from the segments 122 to the imaging processor 152. The data bus 156 has, for illustration purposes, been depicted in FIG. 5 as being individual data lines. It is to be understood, however, that the image data may be transmitted via a data bus or individual data lines as illustrated in FIG. 5. The image data transmitted on the data bus 156 may, as an example, be represented by a series of binary numbers wherein each binary number represents the intensity of light received by an individual photodetector 120. The imaging processor 152 may be a processor as is known in the art that receives, processes and stores image data in a conventional manner. The imaging processor 152 may also use the processed image data to replicate an image of the object being scanned, i.e., the surface 216 of FIG. 1.

The left sensor 130 may be electrically connected to the positioning processor 150 by a data line 157. The right sensor 132 may be electrically connected to the positioning processor 150 by a data line 159. The positioning processor 150 may be electrically connected to the imaging processor 152 by a data line 158. The data lines 157, 159 may, as an example, transmit a series of binary numbers representing image data generated by the sensors 132, 132 to the positioning processor 150. The positioning processor 150 may serve to receive, process, and store image data from the sensors 130, 132. Specifically, the positioning processor 150 may use the image data to determine the position, direction of movement, and velocity of the imaging device 100, FIG. 1, relative to the surface 216. The positioning processor 150 and the imaging processor 152 are illustrated in FIG. 5 as being individual units. It is to be understood, however, that the positioning processor 150 and the imaging processor 152 may be combined into a single processing unit.

Having described the imaging device 100, FIG. 3, and the components thereof the operation of the imaging device 100 including the sensors 130, 132 integrated into the linear array of photodetectors 120 will now be described. The imaging device 100 will be described herein scanning the surface 216 of the page 200, FIG. 2. The flow chart of FIG. 6A and FIG. 6B further describes the operation of the imaging device 100.

Referring to FIG. 2, a coordinate system having a y-direction 240 and an x-direction 250 is used herein to describe the movement of the imaging device 100 relative to the surface 216. The y-direction 240 may consist of a positive y-direction 242 and a negative y-direction 244. The x-direction 250 may consist of a positive x-direction 252 and a negative x-direction 254. In the example described herein, the imaging device 100 will be placed in the positive y-direction 242 above the text 220 and will be moved in the negative y-direction 244 across the text 220. This movement of the imaging device 100 along a single axis is for illustration purposes only. It is to be understood, however, that the imaging device 100 may follow, and is more likely to follow, a meandering path as illustrated by the path 270 in FIG. 1.

The scanning process commences with a user placing the imaging device 100 on the page 200 so that the bottom portion 102 of the imaging device 100 is adjacent to the surface 216 of the page 200. Prior to moving the imaging device 100 relative to the surface 216, a scanning signal is transmitted to the processors 150, 152, FIG. 4, which instructs the processors 150, 152 to receive initial image data from the segments 122 and the sensors 130, 132. The segments 122 generate image data representing the scan line 280 except for the positioning portions 286, 288. The sensors 130, 132 generate image data representing the positioning portions 286, 288 respectively.

Referring to FIG. 5, the image data generated by the segments 122 is transmitted to the imaging processor 152 via the data bus 156. The image data generated by the left sensor 130 is transmitted to the positioning processor 150 via the data line 157 and the image data generated by the right sensor 132 is transmitted to the positioning processor 150 via the data line 159. At this point, the imaging processor 152 has image data representing the scan line portion 280, FIG. 2, of the surface 216, except for the portions of the scan line 280 that intersect the left position portion 286 and the right position portion 288. The positioning processor 150 has image data representing the left position portion 286 and the right position portion 288.

Subsequent to the initial imaging, the positioning processor 150 identifies the image data that was generated by the scan rows 148, FIG. 3, on the sensors 130, 132. This image data represents the portions of the scan line 280, FIG. 2, that was generated by the sensors 130, 132. The positioning processor 150 copies the image data generated by the scan rows 148 and transmits this image data to the imaging processor 152 via the data line 158. Thus, the imaging processor 152 has image data representing the complete scan line portion 280, FIG. 2, of the surface 216. This image data generated during the initial imaging is electronically identified as being generated from an initial position relative to the surface 216.

Subsequent to the initial imaging, the positioning processor 150 analyses the image data and identifies distinct features on the left position portion 286, FIG. 2, and the right position portion 288. The positions of these distinct features relative to the sensors 130, 132 are stored in a conventional memory device.

Referring again to FIG. 2, in the example illustrated herein, the user manually moves the imaging device 100 in the negative y-direction 244 along the surface 216 of the page 200 toward the text 220. From the time the scan signal is transmitted until the scanning operation is terminated, the sensors 130, 132 periodically generate image data representative of the left position portion 286 and the right position portion 288 respectively. The image data generated by the left position sensor 130 is transmitted to the positioning processor 150 via the data line 157 and the image data generated by the right position sensor 132 is transmitted to the positioning processor 150 via the data line 159.

The positioning processor 150 identifies distinct features on the surface 216 of the page 200. The positioning processor 150 may be adapted to detect fine features of the surface 216 that cause a contrast in the image of the surface 216. For example, the positioning processor 150 may detect shadows from crests and troughs in the surface 216. These crests and troughs may be caused by pulp or other material used to manufacture the page 200. The imaging processor 150 stores the positions of the distinct features relative to the sensors 130, 132 in a conventional memory device.

As the imaging device 100 moves relative to the surface 216, the positions of the previously identified distinct features relative to the sensors 130, 132 will move accordingly. In order to measure this movement, the positioning processor 150 analyzes the image data and locates the previously identified distinct features in the left positioning portion 286 and the right positioning portion 288. The positions of these distinct features are identified relative to sensors 130, 132. The positioning processor 150 determines the displacement of the imaging device 100 over the period since image data was last generated by the sensors 130, 132 by taking the difference between the present positions of the distinct features and the previous positions of the distinct features.

When the imaging device 100 has traveled a predetermined distance from the point where image data representing the previous scan line portion 280 was generated, image data representing the present scan line portion 280 of the surface 216 is generated. Referring to FIGS. 1, 2, and 3, The image data representing the present scan line portion 280 is generated as previously described by the photodetectors 120 and the scan rows 148 on the sensors 130, 132. The positioning processor 150 identifies the image data generated by the scan rows 148 and transmits a copy of this image data to the imaging processor 152 via the data line 158. The imaging processor 152 electronically inserts the image data generated by the scan rows 148 into the image data generated by the photodetectors 120. The image processor 152, thus, has image data representing the entire scan line portion 280. The image data is also electronically identified with the location on the surface 216 where the present image data was generated relative to the position where the previous image data was generated.

By identifying the relative locations of the scan line portions of the surface 216, the imaging processor 150 is able to process the image data representing this plurality of scan line portions 280 to accurately replicate the image of the surface 216 of the page 200. The imaging processor 150 may, as an example, use software, commonly known as stitching software, to position the image data representing the plurality of scan line portions 280 relative to each other. The image of the surface 280 may then be readily replicated.

Having described a single embodiment of the imaging device 100, other embodiments of the imaging device 100 will be described below.

Figure 7:
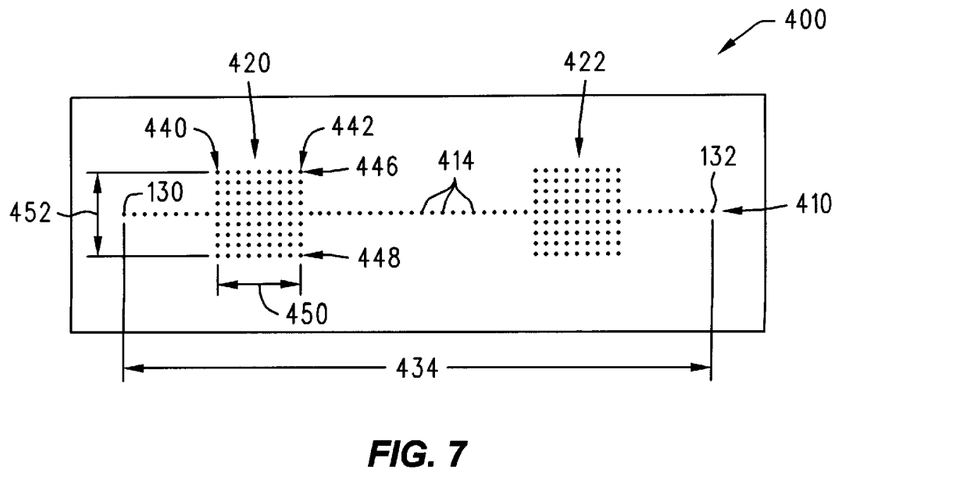
FIG. 7 is a schematic illustration of a linear array of photodetectors and position sensors integrated into a single substrate.

FIG. 7 illustrates an embodiment of a linear array 410 of photodetectors 414 located on a single semiconductor 400. The semiconductor 400 may have a left positioning portion 420 and a right positioning portion 422 integrated into the array 410. The linear array 410 of photodetectors 414 may function in a substantially similar manner as the photodetectors 120 illustrated in FIG. 3. The positioning portions 420, 422 may function in a substantially similar manner as the sensors 130, 132 illustrated in FIG. 3. The positioning portions 420, 422 may comprise sequential rows of photodetectors, thus, creating two-dimensional arrays of photodetectors. Except for the positioning portions 420, 422, the semiconductor 400 may be substantially similar to a charge-coupled device as is known in the art.

The linear array 410 may have a first photodetector 430 and a last photodetector 432. A length 434 may extend between the first photodetector 430 and the last photodetector 432. The linear array 410 may, as an example, comprise 1428 photodetectors 414 between the first photodetector 430 and the last photodetector 432. The photodetectors 414 may, as a further example, be spaced approximately 10 micrometers from centerline to centerline, which makes the length 434 approximately 15 millimeters.

The positioning portions 420, 422 may comprise two-dimensional arrays of photodetectors. The two-dimensional arrays of photodetectors may each have a first column 440, a last column 442, a first row 446, and a last row 448. A height 450 may extend between the first column 440 and the last column 442. A width 452 may extend between the first row 446 and the last row 448. Each column and each row may, as an example, have 30 photodetectors. The height 450 and width 452 may, accordingly, be approximately 0.3 millimeters. It should be noted that the photodetectors 414 and positioning portions 420, 422 illustrated in FIG. 7 have been greatly enlarged for illustration purposes.

As described above, the semiconductor 400 has a very high concentration of photodetectors 414. Unlike the scanner 100 illustrated in FIG. 4, a scanner using the semiconductor 400 typically requires reduction optics, not shown, in order to focus a relatively long scan line portion of an image of an object onto the relatively short linear array 410 of photodetectors 414. Reduction optics are commonly used in scanners and may, as an example, use a Cooke triplet lens rather than a gradient index lens array to reduce the image of the object so as to focus it onto the linear array 410 of photodetectors 414.

Another embodiment of the scanner uses multiple linear arrays of photodetectors to generate image data. These types of scanners are typically used to generate color images of objects by separately imaging the primary light colors of red, green, and blue. In such an application, the positioning sensors may have three rows of photodetectors that are aligned with the three rows of photodetectors used to generate image data. Processing the image data is performed as described above except that three rows of photodetectors on the positioning sensors are used to generate image data rather than the single row as described above.

Referring to FIG. 3, another embodiment of the imaging device 100 uses a higher concentration of photodetectors 147 in the rows 146 of the position sensors 130, 132 than in the linear array of photodetectors 120. This embodiment may be useful when the imaging device 100 is being used on a relatively smooth surface or where position information is more critical. The high concentration of photodetectors 147 allows the imaging device 100 to detect finer distinct features on the surface of an object, which in turn, allows the imaging device 100 to determine its position with greater accuracy.

The imaging device 100 has been described with the first segment 124 and the last segment 126 located at the ends of the linear array of photodetectors 120. The sensors 130 and 132 may, alternatively, be located at the ends of the linear array of photodetectors 120. As described above, the scan rows 148 are aligned along the reference line BB, thus, locating the sensors 130, 132 at the ends of the linear array of photodetectors 120 will have no affect on the image data.

The scanner 100 of FIG. 3 and the semiconductor 400 of FIG. 7 have been illustrated with the photodetectors 120, 414 bisecting the sensors 130, 132, 420, 422. It is to be understood, however, that the photodetectors 120, 414 are not required to bisect the sensors 130, 132, 420, 422. The photodetectors 120, 414 may intersect the sensors 130, 132, 420, 422 at virtually any location.

The position sensors integrated into an imaging array of photodetectors have been described herein as being used within a scanner. It is to be understood, however, that the position sensors integrated into a linear array of photodetectors may be used in other applications. For example, the position sensors may be integrated into a linear array of photodetectors that are commonly used in a facsimile machine to determine the position of a sheet of paper being replicated.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An imaging device comprising:
   a linear array of photodetector elements, said linear array having a first end and a second end, wherein said linear array is aligned along a first axis;
   at least one two-dimensional photodetector segment comprising a two-dimensional array of photodetector elements; and
   wherein said at least one two-dimensional photodetector segment is integrated into said linear array of photodetector elements between said first end and said second end.

2. The device of claim 1:
   wherein said two-dimensional array comprises a plurality of sequential rows of photodetector elements; and
   wherein one row of said plurality of rows of photodetector elements is aligned along said first axis.

3. The device of claim 1 wherein said at least one two-dimensional array of photodetector elements has at least about 30 rows, each having at least about 10 photodetector elements.

4. The device of claim 1 wherein said linear array of photodetector elements and said at least one two-dimensional photodetector segment are mounted to a single substrate.

5. The device of claim 1 wherein said linear array of photodetector elements comprises a plurality of photodetector segments;
   wherein each of said photodetector segments has a first end and a second end;
   wherein a linear array of said photodetector elements is located on each of said photodetector segments between said first ends and said second ends;
   wherein said photodetector segments are positioned end to end to form a linear array of photodetector segments and a linear array of photodetector elements; and
   wherein said at least one two-dimensional photodetector segment is integrated into said at linear array of photodetector segments.

6. The device of claim 1 further comprising a lens associated with photodetector elements and said at least one two-dimensional photodetector segment.

7. The device of claim 6 wherein said lens is a gradient index lens.

8. An imaging device comprising:
   a linear array of photodetector elements, said linear array having a first end and a second end;
   at least one two-dimensional photodetector segment comprising a two-dimensional array of photodetector elements;
   wherein said at least one two-dimensional photodetector segment is located between said first end and said second end; and
   wherein said at least one two-dimensional photodetector segment is spaced from both said first end and said second end.

9. The device of claim 8:
   wherein said linear array of photodetector elements is aligned on an axis;
   wherein said at least one two-dimensional photodetector segment comprises a plurality of rows of photodetector elements; and
   wherein one row of said plurality of rows of photodetector elements is aligned on said axis.

10. A method of imaging an object comprising:
    providing a linear array of photodetector elements aligned along a first axis, said linear array having a first end and a second end;
    providing at least one two-dimensional photodetector segment integrated into said linear array of photodetector elements, said at least one two-dimensional photodetector segment having a plurality of rows of photodetector elements wherein one of said plurality of rows is a scan row;
    causing relative movement between said linear array of photodetector elements and said object;
    focusing an image of said object onto said linear array of photodetector elements and said at least one two-dimensional photodetector segment;
    generating first image data representative of said object with said linear array of photodetector elements and said scan row;
    generating second image data representative of said object with said at least one two-dimensional photodetector segment; and
    performing a first analysis on said second image data to determine the position of said at least one two-dimensional photodetector segment relative to said object.

11. The method of claim 10 wherein said scan row is aligned along said first axis.

12. The method of claim 10 wherein said performing a first analysis comprises performing a first analysis on said second image data to determine the velocity of said at least one two-dimensional photodetector segment relative to said object.

13. The method of claim 10 wherein said performing a first analysis comprises performing a first analysis on said second image data to determine the direction of movement of said at least one two-dimensional photodetector segment relative to said object.

14. The method of claim 10 wherein said first analysis comprises:
- identifying a first location of a distinct feature of said object relative to said at least one two-dimensional photodetector segment;
- recording said first location of said distinct feature relative to said at least one two-dimensional photodetector segment;
- identifying a second location of said distinct feature relative to said at least one two-dimensional photodetector segment as said at least one two-dimensional photodetector segment is moved relative to said object;
- performing an analysis on said first and second locations of said distinct feature relative to said at least one two-dimensional photodetector segment to determine the displacement of said at least one two-dimensional photodetector segment relative to said object.

15. The method of claim 14 further comprising performing an analysis on said first and second locations of said distinct feature relative to said at least one two-dimensional photodetector segment to determine the velocity of said at least one two-dimensional photodetector segment relative to said object.

16. The method of claim 14 further comprising performing an analysis on said first and second locations of said distinct feature relative to said at least one two-dimensional photodetector segment to determine the direction of movement of said at least one two-dimensional photodetector segment relative to said object.

17. An imaging device comprising:
- a first imaging means for converting a linear portion of an image of an object to machine-readable data;
- a second imaging means for converting a two-dimensional portion of an image of said object to machine-readable data, said second imaging means being integrated into said first imaging means;
- a first processing means operatively associated with said second imaging means for determining the location of said second imaging means relative to said object.

18. The imaging device of claim 17 further comprising a second processing means operatively associated with said second imaging means for determining a velocity of said second imaging means relative to said object.

19. The imaging device of claim 18 further comprising a third processing means operatively associated with said second imaging means for determining the a direction of movement of said second imaging means relative to said object.

* * * * *